United States Patent
Swaminathan et al.

(10) Patent No.: US 8,166,191 B1
(45) Date of Patent: Apr. 24, 2012

(54) HINT BASED MEDIA CONTENT STREAMING

(75) Inventors: Viswanathan Swaminathan, Fremont, CA (US); Amine El Kamel, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 200 days.

(21) Appl. No.: 12/542,582

(22) Filed: Aug. 17, 2009

(51) Int. Cl.
G06F 15/16 (2006.01)
H04N 7/167 (2006.01)

(52) U.S. Cl. ............... 709/231; 709/232; 380/212

(58) Field of Classification Search .............. 709/230, 709/231, 232, 233; 380/212
See application file for complete search history.

(56) References Cited

U.S. PATENT DOCUMENTS

| | | | |
|---|---|---|---|
| 5,751,968 A | 5/1998 | Cohen | |
| 5,805,804 A | 9/1998 | Laursen et al. | |
| 5,841,432 A | 11/1998 | Carmel et al. | |
| 5,892,915 A | 4/1999 | Duso et al. | |
| 6,044,205 A | 3/2000 | Reed et al. | |
| 6,064,379 A | 5/2000 | DeMoney | |
| 6,085,252 A | 7/2000 | Zhu et al. | |
| 6,112,024 A | 8/2000 | Almond et al. | |
| 6,148,334 A | 11/2000 | Imai et al. | |
| 6,163,796 A | 12/2000 | Yokomizo | |
| 6,216,157 B1 | 4/2001 | Vishwanath et al. | |
| 6,397,230 B1 | 5/2002 | Carmel et al. | |
| 6,453,355 B1 | 9/2002 | Jones et al. | |
| 6,477,580 B1 | 11/2002 | Bowman-Amuah | |
| 6,487,564 B1 | 11/2002 | Asai et al. | |
| 6,549,934 B1 | 4/2003 | Peterson et al. | |
| 6,631,418 B1 | 10/2003 | Watkins | |
| 6,744,763 B1 * | 6/2004 | Jones et al. | 370/394 |
| 6,760,378 B1 | 7/2004 | Conklin | |
| 6,763,390 B1 | 7/2004 | Kovacevic et al. | |
| 6,801,947 B1 | 10/2004 | Li | |
| 6,823,394 B2 | 11/2004 | Waldvogel et al. | |
| 6,877,010 B2 | 4/2005 | Smith-Semedo et al. | |
| 6,985,932 B1 | 1/2006 | Glaser et al. | |
| 6,990,497 B2 | 1/2006 | O'Rourke et al. | |
| 6,999,424 B1 | 2/2006 | Kovacevic et al. | |
| 7,003,570 B2 | 2/2006 | Messinger et al. | |
| 7,133,922 B1 | 11/2006 | She et al. | |

(Continued)

FOREIGN PATENT DOCUMENTS

WO  WO 2009003683 A1 *  1/2009

OTHER PUBLICATIONS

"Real Time Messaging Protocol Chunk Stream: Real Time Messaging Protocol (RTMP) Message Formats—draft-rtmp-01.txt", Apr. 2009, Adobe Systems Incorporated.*

(Continued)

*Primary Examiner* — Brian J Gillis
(74) *Attorney, Agent, or Firm* — Fish & Richardson P.C.

(57) ABSTRACT

Methods, systems, and apparatus, including computer programs encoded on a computer storage medium, for media content streaming can include communicating with a remote device to stream media content to the remote device, accessing hint information associated with the media content, and transmitting a data stream to the remote device based on the hint information. The hint information can include message headers arranged in a transmission order sequence that correspond to respective media data samples. Accessing hint information can include accessing a hint segment that includes the message headers interleaved with the media data samples.

10 Claims, 8 Drawing Sheets

U.S. PATENT DOCUMENTS

| | | | |
|---|---|---|---|
| 7,149,813 | B2 | 12/2006 | Flanagin et al. |
| 7,272,658 | B1 | 9/2007 | Edelman et al. |
| 7,383,289 | B2 | 6/2008 | Kraft |
| 7,548,948 | B2 | 6/2009 | Klemets et al. |
| 7,558,296 | B2 * | 7/2009 | Toma et al. ............. 370/535 |
| 7,716,345 | B2 | 5/2010 | Klemets |
| 2001/0004417 | A1 | 6/2001 | Narutoshi et al. |
| 2002/0055989 | A1 | 5/2002 | Stringer-Calvert et al. |
| 2002/0065926 | A1 | 5/2002 | Hackney et al. |
| 2002/0103815 | A1 | 8/2002 | Duvillier et al. |
| 2002/0116716 | A1 | 8/2002 | Sideman |
| 2003/0046431 | A1 | 3/2003 | Belleguie |
| 2003/0061369 | A1 * | 3/2003 | Aksu et al. .............. 709/231 |
| 2003/0115268 | A1 | 6/2003 | Esposito |
| 2003/0154239 | A1 | 8/2003 | Davis et al. |
| 2003/0161324 | A1 * | 8/2003 | Clemens et al. ........ 370/395.42 |
| 2003/0187993 | A1 | 10/2003 | Ribot |
| 2003/0221014 | A1 | 11/2003 | Kosiba et al. |
| 2004/0032424 | A1 | 2/2004 | Florschuetz |
| 2004/0098533 | A1 | 5/2004 | Henshaw et al. |
| 2004/0215803 | A1 | 10/2004 | Yamada et al. |
| 2005/0083401 | A1 * | 4/2005 | Mizutani et al. ............ 348/25 |
| 2005/0102427 | A1 | 5/2005 | Yokota et al. |
| 2006/0161516 | A1 | 7/2006 | Clarke et al. |
| 2006/0224687 | A1 | 10/2006 | Popkin et al. |
| 2008/0256255 | A1 * | 10/2008 | Mordovskoi et al. ........ 709/231 |
| 2008/0320155 | A1 * | 12/2008 | Ganapathy et al. .......... 709/230 |
| 2009/0106386 | A1 | 4/2009 | Zuckerman et al. |
| 2009/0119594 | A1 * | 5/2009 | Hannuksela .............. 715/723 |
| 2009/0271525 | A1 | 10/2009 | Jung et al. |
| 2010/0318600 | A1 | 12/2010 | Furbeck |

OTHER PUBLICATIONS

"Advantages of On2 VP6 Technology". Oct. 20, 2006, On2 Technologies white paper., 18 pages.

"Chapter 6: What is Streaming Media and How does it Work?". 1999, accessed Jul. 18, 2007, RealNetworks. http://service.real.com/help/player/plus_manual.g2/htmlfiles/whatisrp.htm, 13 pages.

"Common Multimedia Formats and Extentions". SorensonMedia. accessed Jul. 18, 2007. http://www.sorensontech.comllearn/video_file_format.php, 2 pages.

Quicklime Streaming Server Administrator's Guide. Apple Computer, Inc. 2002, 84 pages.

"Truemotion VP7 Video Codec". On2 Technologies white paper. Jan. 10, 2005, 13 pages.

"Real Time Messaging Protocol Chunk Stream", Apr. 2009, Adobe Systems Incorporated, 70 pages.

International Standard, "Information Technology—Coding of Audio-Visual Objects, Part 12: ISO Base Media File Format" Apr. 1, 2005, ISO/IEC 14496-12, 94 pages.

Schulzrinne, H. et al. "Real Time Streaming Protocol (RTSP)". 1998, The Internet Society, 86 pages.

Swaminathan et al., "Media Content Streaming," U.S. Appl. No. 12/542,552, filed Aug. 17, 2009, to be published by the USPTO, 43 pages.

* cited by examiner

HINT BASED MEDIA CONTENT STREAMING

BACKGROUND

This specification relates to streaming media content.

A networked server can stream media content to one or more computers connected to a communication network. Various examples of media content include video, audio, text, and combinations thereof. A computer can request and receive media content. A computer can render media content to an output device such as a video display, speaker, or a printer.

Some servers can use one or more protocols such as the Real-Time Messaging Protocol (RTMP) of Adobe Systems Incorporated of San Jose, Calif. to send media content over a network such as one based on an Internet Protocol (IP). RTMP can provide multiplexing and packetizing services for a higher-level multimedia stream protocol. RTMP messages can include a timestamp and payload type identification information. Protocols such as RTMP can use a reliable transport protocol such as Transmission Control Protocol (TCP) to provide guaranteed timestamp-ordered end-to-end delivery of messages, across one or more streams.

SUMMARY

This specification describes technologies relating to media content streaming based on hint information.

In one aspect, methods for media content streaming can include communicating with a remote device to stream media content to the remote device. The methods can include accessing hint information associated with the media content. The hint information can include message headers arranged in a transmission order sequence that can correspond to respective media data samples. A message header can include a message stream identifier, a message type identifier, a timestamp, and a message length value. The methods can include transmitting a data stream to the remote device. A data stream can include messages that are based on the message headers. A data stream can include messages arranged in a transmission order sequence. A message can include a message header and a media data sample. Other implementations can include corresponding systems, apparatus, and computer programs, configured to perform the actions of the methods, encoded on computer storage devices.

These and other implementations can include one or more of the following features. Separate ones of the transmitted messages can be based on a different one of the message headers and a corresponding different one of the media data samples. Accessing hint information can include accessing a hint segment that includes the message headers interleaved with the media data samples. Separate ones of the media data samples can be arranged as message payload data for corresponding ones of the message headers. A hint segment can include a media data sample associated with audio data interleaved with a media data sample associated with video data. Transmitting the data stream to the remote device can include multiplexing first messages that include audio data with second messages that include video data on the data stream. Accessing hint information can include accessing a hint segment that includes the message headers interleaved with pointers to corresponding media data samples. Transmitting the data stream to the remote device can include transmitting the data stream in accordance with a Real-Time Messaging Protocol (RTMP). Each message header can be arranged according to a RTMP message header format. These and other implementations can include operating a server to deliver multiple streams to remote devices based on information including the hint information These and other implementations can include accessing a document that includes a hint segment, a media metadata track associated with at least a portion of the media data samples, and a hint metadata track. The hint segment can include the message headers interleaved with the media data samples. The hint metadata track can include pointers to respective ones of the message headers. The media metadata track can include pointers to respective associated ones of the media data samples within the hint segment.

In another aspect, methods for media content streaming can include causing a processor to use hint information associated with media content to transmit a data stream and receiving the data stream. The hint information can include message headers, arranged in a transmission order sequence, that correspond to respective media data samples, where separate ones of the message headers include a message stream identifier, a message type identifier, a timestamp, and a message length value. A data stream can include messages arranged in the transmission order sequence, where separate ones of the messages are based on a different one of the message headers and a corresponding different one of the media data samples. Other implementations can include corresponding systems, apparatus, and computer programs, configured to perform the actions of the methods, encoded on computer storage devices.

These and other implementations can include one or more of the following features. Receiving the data stream comprises can include multiplexed first messages that include audio data with second messages that include video data on the data stream. Receiving the data stream can include receiving the data stream in accordance with a RTMP. Each message header can be arranged according to a RTMP message header format.

In another aspect, media content streaming systems can include one or more remote device configured to request and receive media content, and one or more endpoints, operable to interact with the remote device, that are configured to perform one or more of the operations described herein.

Particular embodiments of the subject matter described in this specification can be implemented so as to realize one or more of the following advantages. One or more of the described technologies can increase media content streaming throughput. One or more of the described technologies can decrease an amount of computer storage space required to store a media document, and a smaller document size can decrease document access latency. One or more of the described technologies can decrease media stream packet construction times and can make these times more predictable. One or more of the described technologies can increase the number of concurrent streams handled by a server.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
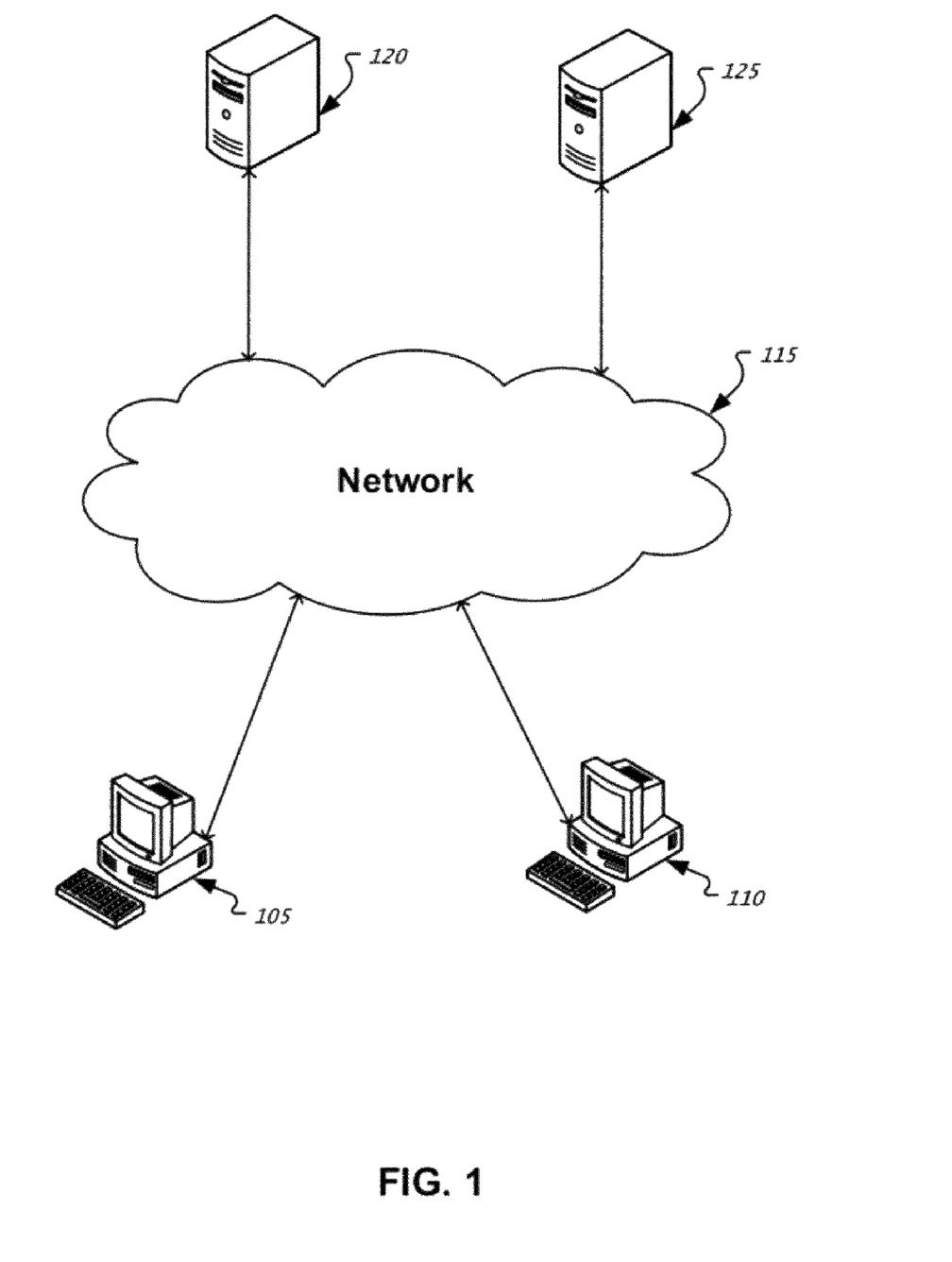
FIG. 1 shows an example of a communication network connected with computing devices.

FIG. 1 shows an example of a communication network connected with computing devices. Network endpoints 105, 110, 120, 125 can connect to a communication network 115 such as the Internet or a Local Area Network (LAN). Examples of endpoints 105, 110, 120, 125 can include computing devices such as a mobile phone, personal computer 105, 110 or a computer such as a server 120, 125. An endpoint can include one or more processors that can be programmed or configured to perform one or more operations mentioned in the present disclosure. In some implementations, a processor can include multiple processors or processor cores. A network endpoint can be identified as a client, a server, or both, but in any case, a network endpoint necessarily includes some hardware since it includes a physical device.

Endpoints 105, 110, 120, 125 can access electronic documents such as media documents. An electronic document (which for brevity will simply be referred to as a document) does not necessarily correspond to a file. A document may be stored in a portion of a file that holds other documents, in a single file dedicated to the document in question, or in multiple coordinated files. The document need not be a text file or a document in the sense of a word processor. The document can include audio, video, images, and data content. In other examples, the document can be any audio, video, image, or data file. Also the document can be streaming versions of the aforementioned document types.

Endpoints 105, 110, 120, 125 can establish connections with other endpoints 105, 110, 120, 125. For example, servers 120, 125 can establish connections with other servers 120, 125 or with computers 105, 110. For example, computers 105, 110 can establish connections with other computers 105, 110 or with servers 120, 125. In some implementations, TCP/IP can transport data between network endpoints 105, 110, 120, 125. In some implementations, network endpoints 105, 110, 120, 125 can communicate with each other using RTMP over TCP/IP. For example, a computer 105 can receive a media stream from a server 120 using RTMP.

A network endpoint can run one or more applications that include support for RTMP such as ADOBE® FLASH® Player and/or ADOBE® AIR® software, available from Adobe Systems Incorporated, of San Jose, Calif. For example, some servers can use RTMP to stream ADOBE® FLASH® content. In some implementations, a server such as an one configured as an ADOBE® FLASH® Media Interactive Server (FMS) can stream media content to an endpoint running ADOBE® FLASH® Player. A FMS can access media information such as a FLASH® Video (e.g., F4V) document to obtain media content. A F4V based document can include media content and can be in accordance with an International Organization for Standardization (ISO) Base Media File Format.

A server can process a request from a client that requests media content. In some implementations, a server cluster containing multiple servers can process requests from clients in a distributed fashion. A server can stream media content over a network such as the Internet to a client. In some implementations, streaming media content can include sending RTMP messages that include one or more media data samples such as audio samples and video samples. A server can access a document such as one in accordance with a MPEG4 format to obtain media data samples.

Servers can use hint information to process media content. Some document formats such as ones based on an ISO MPEG4 format can support an inclusion of hint information. Hint information can include a hint media data segment and can include a hint metadata track.

Hint media data can include one or more hint samples. A hint sample can include a network protocol header. In some implementations, a hint sample can include a network protocol header and one or more of an audio sample, video sample, or another type of sample such as text. In some implementations, a hint sample can include a network protocol header and a pointer to a sample in a different media data segment in lieu of containing the sample itself.

In some implementations, a server can use information in a hint media data segment to stream media content. A hint metadata track can contain pointers to locations of hint samples in a hint media data segment of a document. In some implementations, a server can use information in a hint metadata track and a corresponding hint media data segment to stream media content.

In some implementations, a hint sample can include a RTMP header. A corresponding RTMP hint metadata track can include a pointer to a hint sample, containing a RTMP header, in a RTMP hint media data segment. Hint media data can include hint samples associated with different media data sample types. In some implementations, a document can include one segment of multiplexed hint media data containing RTMP headers and corresponding payload information. Payload information can include a payload prepared for transmission or a pointer to obtain data to construct a payload portion of a message. For example, one hint media data segment in a document can include multiplexed audio and video information associated with a movie. The RTMP packet information in a hint media data segment can be arranged by timestamp.

Figure 2:
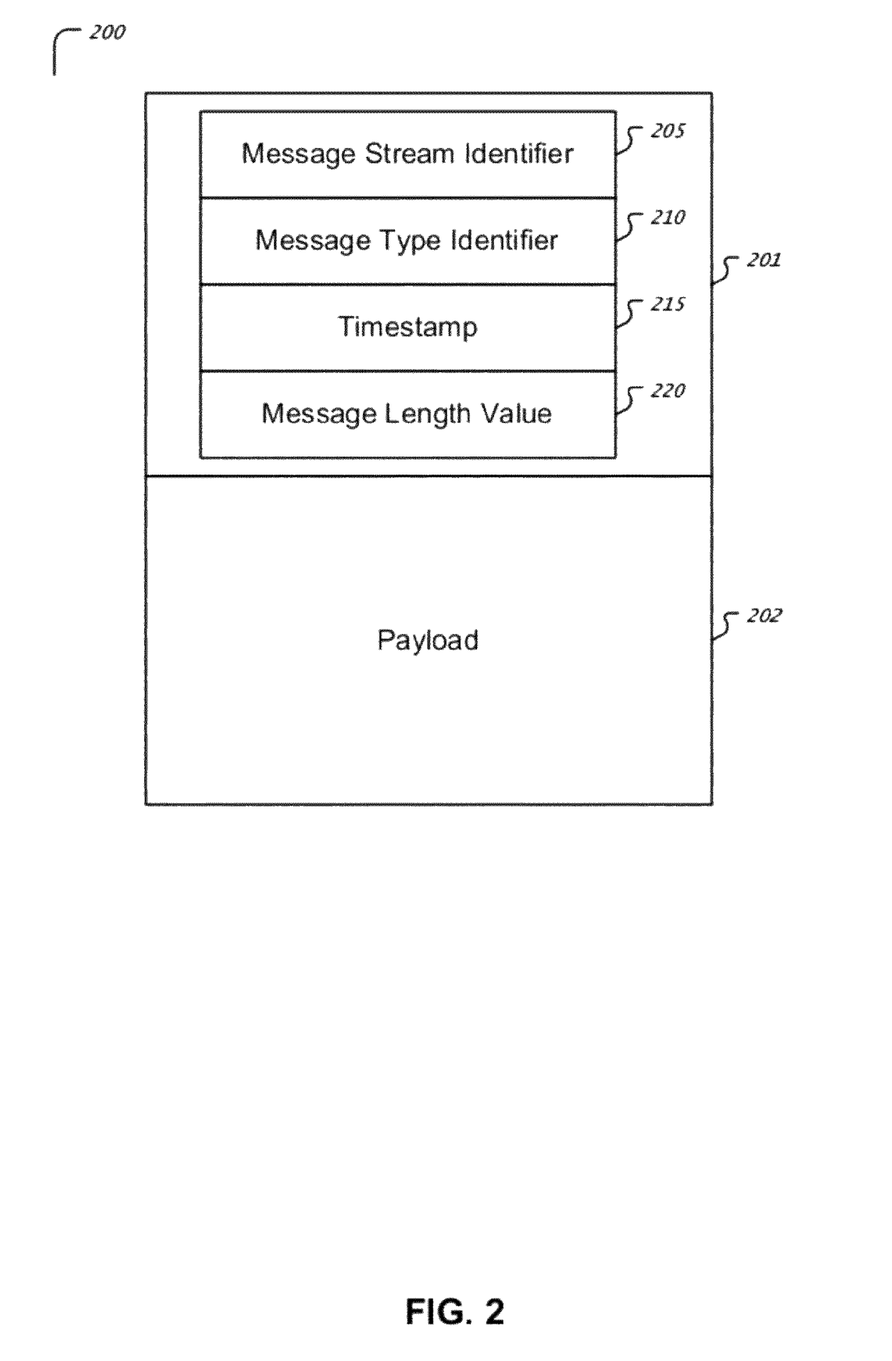
FIG. 2 shows an example of a RTMP header and corresponding payload.

FIG. 2 shows an example of a RTMP header and corresponding payload. A RTMP message 200 can include a RTMP header 201 and a corresponding payload 202. A RTMP header 201 can include a message stream identifier 205, a message type identifier 210, a timestamp 215, and a message length value 220. In some stream communications, a payload 202 including data can immediately follow a corresponding RTMP header 200.

Figure 3:
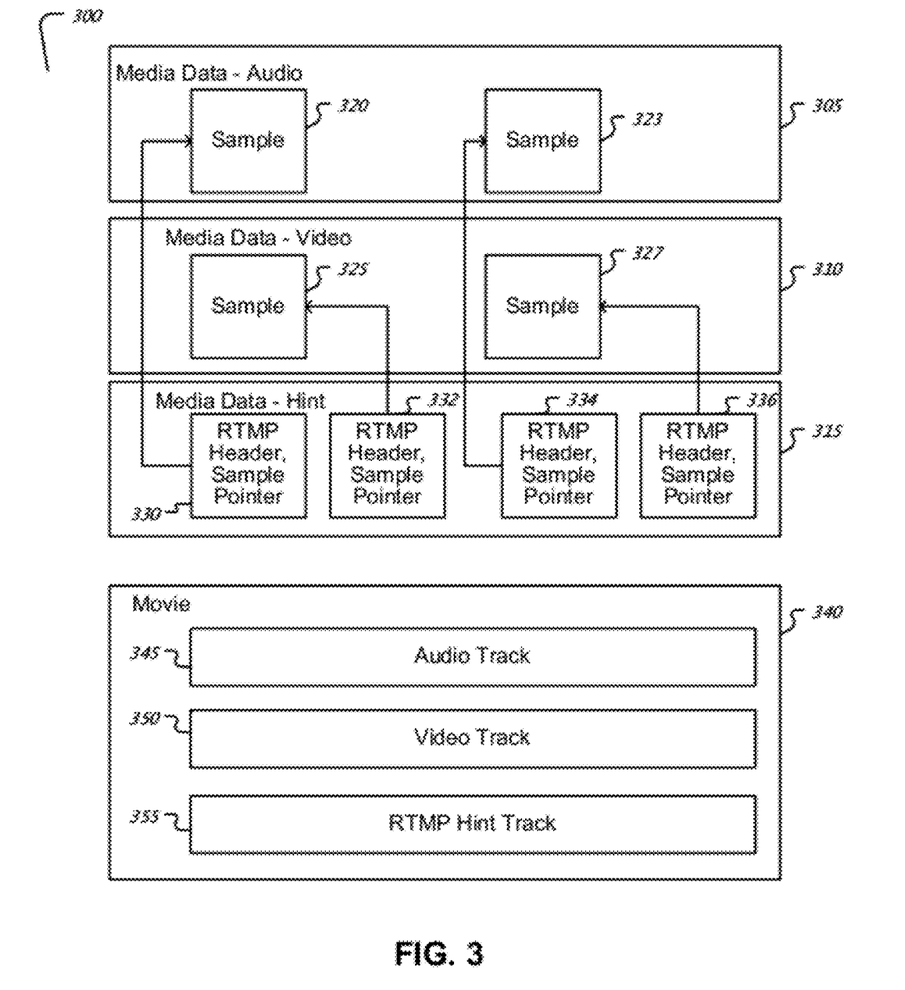
FIG. 3 shows a media document example with hint samples including a RTMP header and a sample pointer.

FIG. 3 shows a media document example with hint samples including a RTMP header and a sample pointer. A document 300 can include one or more segments of media data such as audio media data 305, video media data 310, and hint media data 315. In some implementations, a document 300 can include media data such as text. Audio media data 305 can include one or more audio samples 320, 323. Video media data 310 can include one or more video samples 325, 327. Hint media data 315 can include one or more hint samples 330, 332, 334, 336.

A hint sample 330, 332, 334, 336 can include a RTMP header and a sample pointer such as one pointing to a location of an audio sample 320, 323 or a video sample 325, 327. In some implementations, hint samples 330, 332, 334, 336 are arranged in a transmission order sequence. For example, an endpoint can access hint samples 330, 332, 334, 336 in hint media data 315 to construct messages to stream to a client. Constructing a stream message can include accessing a media sample 320, 325, 323, 327 based on a sample pointer in a hint sample 330, 332, 334, 336.

The document 300 can include a movie box 340 to describe the contents of the media data 305, 310, 315. Movie box 340 is not limited to describing movie data, but can describe other content. The movie box 340 can include metadata tracks such as an audio track 345, a video track 350, and a RTMP hint track 355 that respectively corresponds to audio media data 305, video media data 310, and hint media data 315. In some implementations, various movie box tracks 345, 350, 355 can include pointers to locations of samples in respective media data 305, 310, 315. In some implementations, a movie box 340 can include information about random access samples in one or more media data segments, such information can be used for seeking In some implementations, an endpoint can render a movie to a display based on the sequence of pointers contained in tracks such as an audio track 345 and a video track 350. In some implementations, an endpoint can render a movie to a display based on the sequence of pointers contained in a RTMP hint track 355. In some implementations, an endpoint can stream a movie over a RTMP connection based on information such as an ordering of pointers in a RTMP hint track 355, an ordering of message data in a segment of hint media data 315, or a combination thereof.

Figure 4:
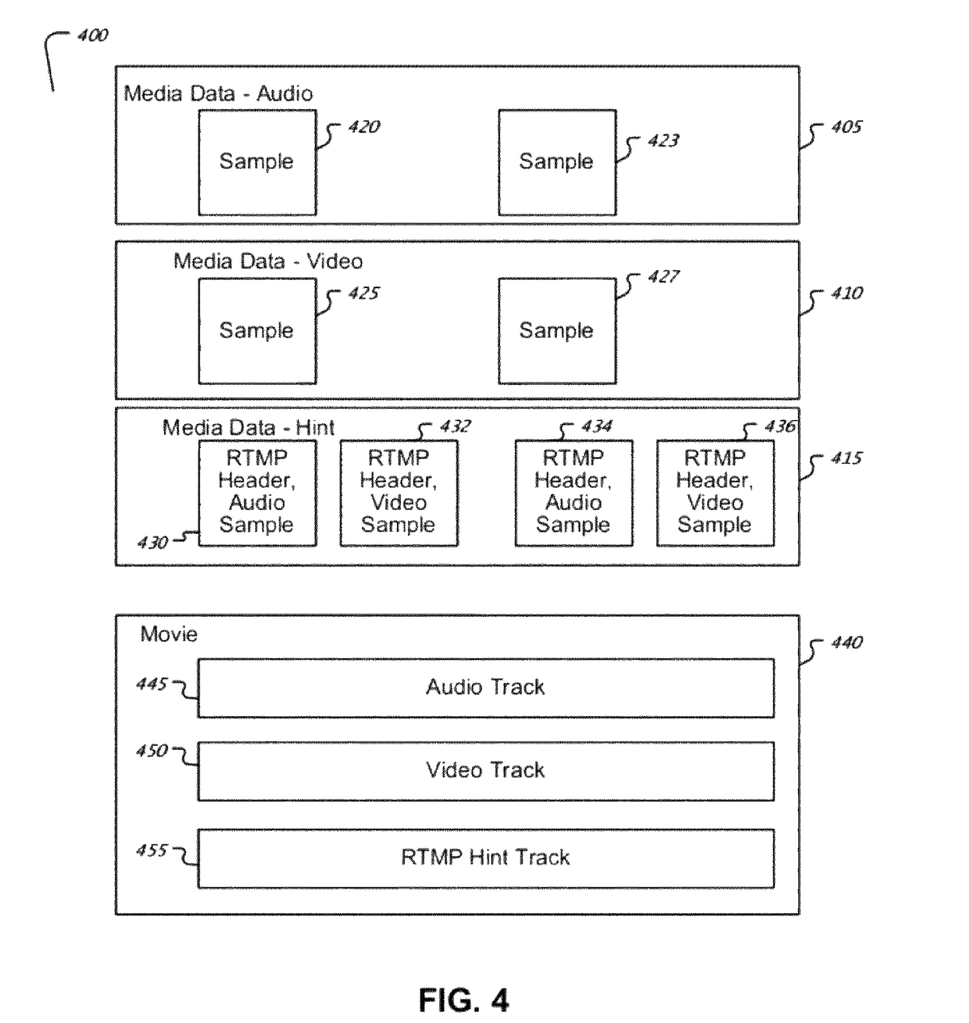
FIG. 4 shows a media document example with hint samples including a RTMP header and a sample.

FIG. 4 shows a media document example with hint samples including a RTMP header and a sample. A document 400 can include one or more segments of media data such as audio media data 405, video media data 410, and hint media data 415. In some implementations, a document 400 can include media data such as text. Audio media data 405 can include one or more audio samples 420, 423. Video media data 410 can include one or more video samples 425, 427. Hint media data 415 can include one or more hint samples 430, 432, 434, 436.

A hint sample 430, 432, 434, 436 can include a RTMP header and a sample such as a duplicate one of a sample that is contained in a media data segment such as an audio sample 420, 423 in an audio segment or a video sample 425, 427 in a video segment. In some implementations, hint samples 430, 432, 434, 436 are arranged in a transmission order sequence. For example, an endpoint can access hint samples 430, 432, 434, 436 in hint media data 415 to stream messages to a client. In some implementations, streaming messages can include directly sending a hint sample 430, 432, 434, 436, as is, in a data stream to a client. For example, a hint sample can be arranged as a properly formatted RTMP message that includes a media data sample such as audio, video, or text situated as the message's payload. In some implementations, a server can modify one or more portions of a RTMP message included in a hint sample before sending the RTMP message.

The document 400 can include a movie box 440 to describe the contents of the media data 405, 410, 415. Movie box 440 is not limited to describing movie data, but can describe other content. The movie box 440 can include metadata tracks such as an audio track 445, a video track 450, and RTMP hint track 455 that respectively correspond to audio media data 405, video media data 410, and hint media data 415. In some implementations, various movie box tracks 445, 450, 455 can include pointers to locations of samples in respective media data 405, 410, 415.

In some implementations, an endpoint can render a movie to a display based on the sequence of pointers contained in tracks such as an audio track 445 and a video track 450. In some implementations, an endpoint can render a movie to a display based on the sequence of pointers contained in a RTMP hint track 455. In some implementations, an endpoint can stream a movie over a RTMP connection based information such as an ordering of pointers in a RTMP hint track 455, an ordering of message data in a segment of hint media data 415, or a combination thereof.

Figure 5:
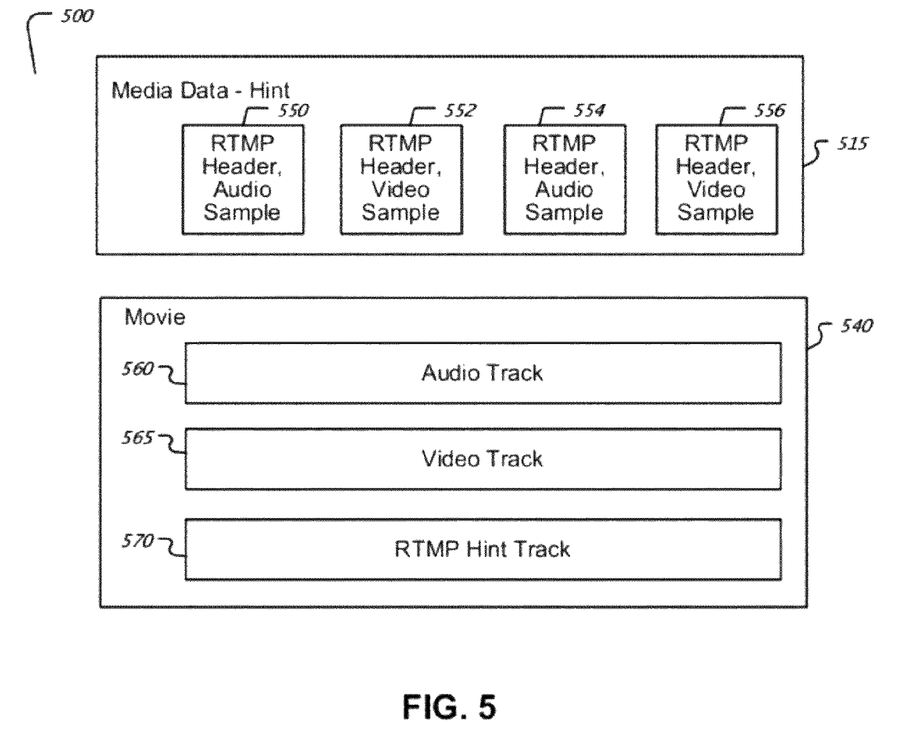
FIG. 5 shows a media document example in accordance with a non-duplication format.

FIG. 5 shows a media document example in accordance with a non-duplication format. A server can generate a document in a non-duplication mode where media data samples are not duplicated between different media data segments such as video, audio, text and a hint media data segment. In some implementations, the media content stored in a hint media data segment of a document can suffice to generate a messages for a data stream. In some non-duplication formats, a media document 500 can include a segment of hint media data 515 in lieu of other segments of media data such as a video media data segment and audio media data segment. In some implementations, a non-duplication mode can reduce a size of a generated media document and can increase a server's streaming throughput.

Hint media data 515 can include one or more hint samples 550, 552, 554, 556. A hint sample 550, 552, 554, 556 can include a RTMP header and a sample. In some hint samples, a hint sample 550, 554 can include a RTMP header and an audio sample. In some other hint samples, a hint sample 552, 556 can include a RTMP header and a video sample.

Hint media data 515 can include hint samples 550, 554 associated with audio interleaved with hint samples 552, 556 associated with video. In some implementations, hint samples 550, 552, 554, 556 are arranged in a transmission order sequence. For example, an endpoint can access hint samples 550, 552, 554, 556 in hint media data 515 to stream messages to a client. In some implementations, streaming messages can include directly sending a hint sample 550, 552, 554, 556, as is, in a data stream to a client. For example, a hint sample can be arranged as a properly formatted RTMP message with a sample contained in the hint sample situated as the message's payload.

In some implementations, a document 500 can include a movie box 540 to describe the contents of hint media data 515. The movie box 540 can include metadata tracks such as an audio track 560, a video track 565, and RTMP hint track 570. The RTMP hint track 570 can include pointers to associated hint samples 550, 552, 554, 556 in the hint media data 515. The audio track 560 can include pointers to locations of audio samples in respective hint samples 550, 554 associated with audio. The video track 565 can include pointers to locations of video samples in respective hint samples 552, 556 associated with video.

In some implementations, an endpoint can render a movie to a display based on the sequence of pointers contained in tracks such as an audio track 560 and a video track 565. In some implementations, an endpoint can render a movie to a display based on the sequence of pointers contained in a RTMP hint track 570. In some implementations, an endpoint can stream a movie over a RTMP connection based on an ordering of pointers in a RTMP hint track 570. In some implementations, an endpoint can stream a movie over a RTMP connection based on an ordering of hint media data 515.

Figure 6:
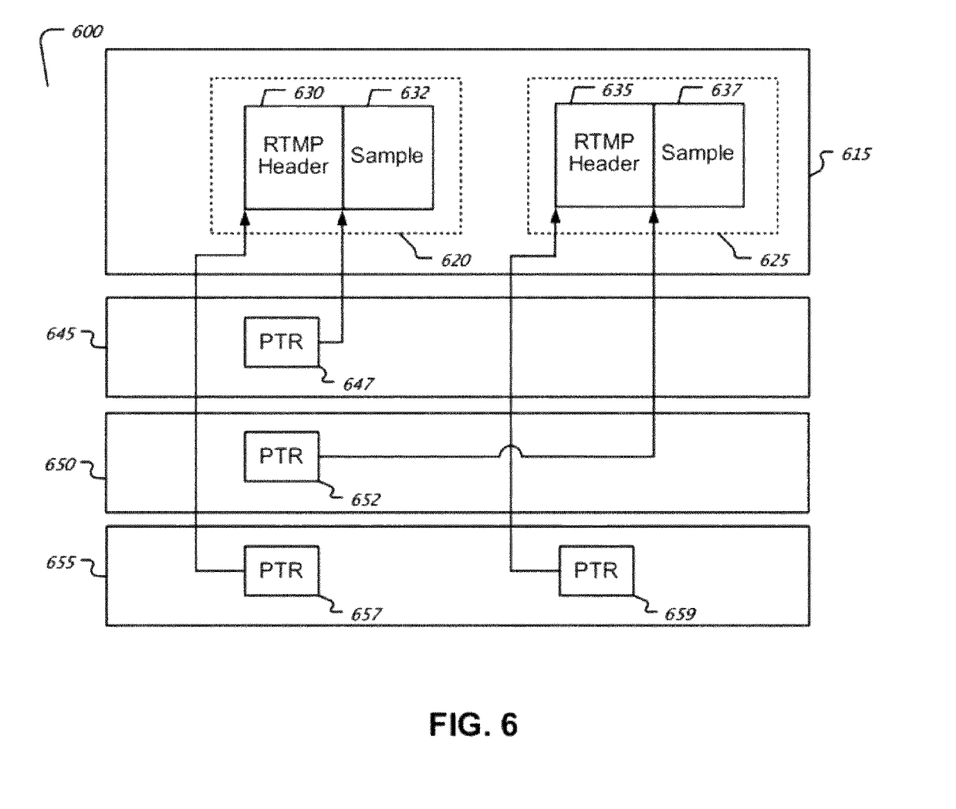
FIG. 6 shows an example of pointer relationships in a media document.

FIG. 6 shows an example of pointer relationships in a media document. A document 600 can include hint media data 615. Hint media data 615 can include multiple hint samples 620, 625. A first hint sample 620 can include a header such as a RTMP header 630 and a corresponding payload including a sample 632. A second hint sample 625 can include a header such as a RTMP header 635 and a corresponding payload including a sample 637.

A document 600 can include multiple metadata tracks 645, 650, 655 that correspond to one or more media types such as video, audio, text, or hint. The document 600 can include a first track 645 that includes a pointer 647 to a location of a sample 632 of a first media type situated in a hint sample 620. The document 600 can include a second track 650 that includes a pointer 652 to a location of a sample 637 of a second media type situated in a different hint sample 625.

A hint track 655 in the document 600 can include pointers 657, 659 to locations of respective hint samples 620, 625. In some implementations, hint media data 600 can interleave hint samples 620, 625 associated with different media types.

In some implementations, a document 600 can include pointers synchronized for playback. In some implementations, pointers can be synchronized to an event or a specific time duration in media playback or streaming. For example, pointers 647, 652 in the first and second tracks 645, 650 can be synchronized to an event. Multiple hint pointers 657, 659 in the hint track 655 can be synchronized to the same event based on their corresponding samples 632, 637 being related to the event.

A server can convert a document without hint information to a document that includes hint information. A server can use a format such as one indicated by the examples of FIGS. 3, 4, 5, and 6 to generate a document with hint information. In some implementations, a standalone software routine can add hinting information to a document, which can be placed on a server for distribution. In some implementations, a server can use a non duplication mode to strip out media data segments and replace them with one hint media data segment that contains their respective media sample data; the server can modify one or more additional portions of the original document to reflect this change.

Figure 7:
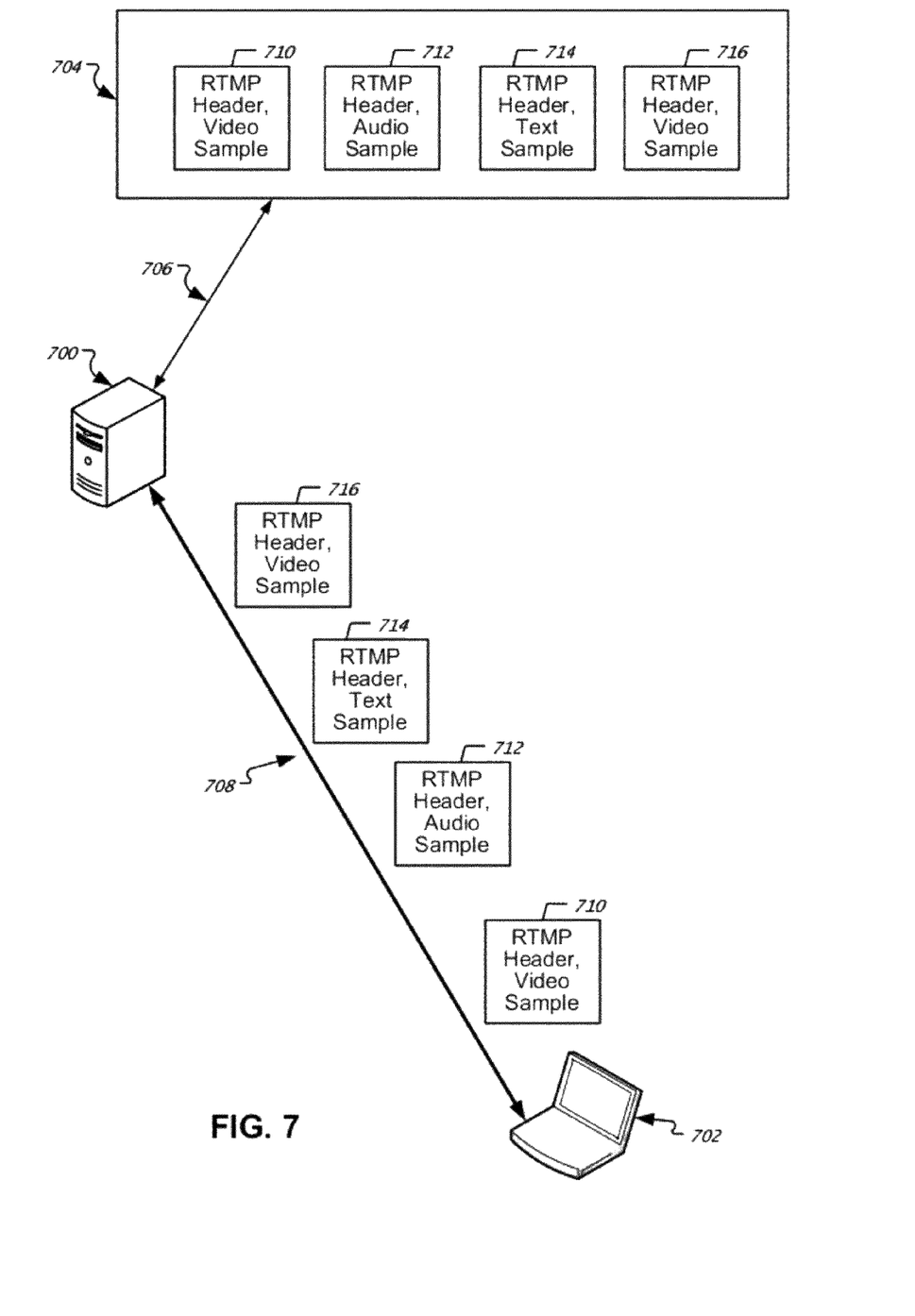
FIG. 7 shows an examples of a server streaming data from a document.

FIG. 7 shows an examples of a server streaming data from a document. A server 700 can send data via a stream connection 708 to a networked endpoint 702 such as a laptop or a mobile device. The stream connection 708 can use RTMP to stream data. The server 700 can access a document 704, that includes hint media data, via a data interface 706 such as a memory bus, network interface, or a disk drive interface. Hint media data can include multiple hint samples 710, 712, 714, 716 with various types of sample payloads, e.g., video, audio, text. Hint samples with different sample payload types can be multiplexed into a single hint segment, which can increase server throughput. In some implementations, a single hint segment can interleave different media types. For example, a single hint segment can include hint sample payloads that respectively alternate between two or more media types.

In some implementations, the server 700 can access the document 704 stored on a disk drive and can store the document 704 in memory such as a random access memory for a future access. The server 700 can access hint samples 710, 712, 714, 716 in the document 704 in a transmission order sequence, which can be determined by their arrangement in the document 704. The server 700 can send RTMP messages that are based on respective hint samples 710, 712, 714, 716 over the stream connection 708. In some implementations, the server 700 can send messages based on the transmission order sequence. In some implementations, the server 700 can perform one or more byte swap operations to prepare data packets containing hint samples 710, 712, 714, 716 for transmission over a network. The endpoint 702 can receive RTMP messages that are based on the hint samples 710, 712, 714, 716 to render media content.

Figure 8:
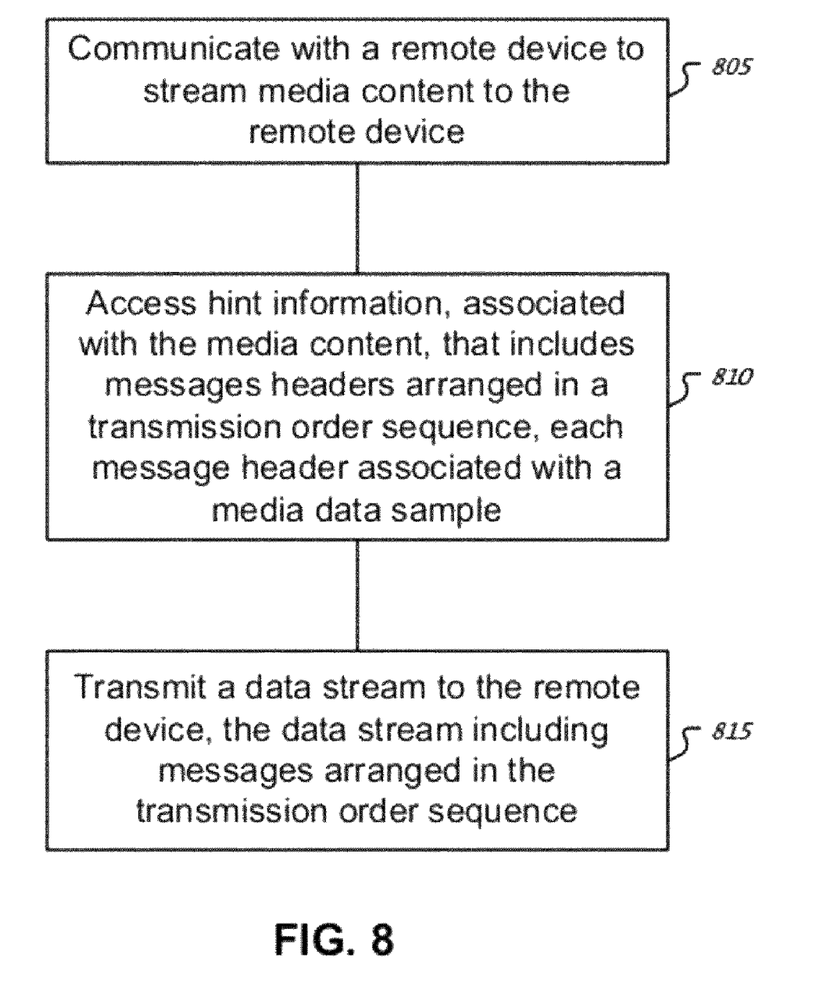
FIG. 8 shows an example of a media content streaming technique.

FIG. 8 shows an example of a media content streaming technique. An endpoint can stream media content such as a movie to another endpoint such as a remote device. For example, an server can communicate with a remote device to stream media content to the remote device (805). In some implementations, the server can access a media document based on a request from the remote device.

An endpoint can access hint information associated with the media content (810). The hint information can include message headers arranged in a transmission order sequence. A message header can correspond to a media data sample. A message header can include a message stream identifier, a message type identifier, a timestamp, and a message length value. In some implementations, hint information can include samples associated with one or more media types such as audio, video, or text. For example, the hint information can include samples associated with different media types. In some implementations, hint information can include pointers associated with one or more media types such as audio, video, or text. For example, the hint information can include pointers associated with different media types.

An endpoint can transmit one or more data streams to a remote device (815). The data stream can include messages arranged in the transmission order sequence. For example, the endpoint can stream messages based on the messages headers and corresponding payload information in the hint information.

In some implementations, a hint sample can include multiple media data samples. In some implementations, multiple hint samples can include the same media data sample. In some implementations, a hint media data segment can include hint samples with pointers to media data samples and can include hint samples with media data samples. In some implementations, hint samples can be transmitted to a client, which can use the hint samples to render media content. In some implementations, a server can transmit hint samples to an intermediate endpoint which can use the hint samples to deliver media content to a client. An intermediate endpoint can use different communication techniques such as different network protocols for sending and receiving hint information. In some implementations, a server can add hint samples to a document and can cache hint samples for future use.

In some implementations, a server can access protected media content in a document. In some implementations, a server can protect media content before distribution to clients. In some implementations, a server can use one or more digital rights management (DRM) techniques to control access privileges associated with media content. In some implementations, a server can encrypt media content and control distribution of associated key material to decrypt said media content. In some implementations, a server can use an ADOBE® DRM system, available from Adobe Systems Incorporated of San Jose, Calif.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, comprising:
communicating with a remote device to stream media content to the remote device;
accessing hint information associated with the media content, the hint information comprising message headers, arranged in a transmission order sequence, that correspond to respective media data samples, the message headers being interleaved with the media data samples on a track, the media data samples including one or more video samples and one or more audio samples, wherein separate ones of the media data samples are arranged as message payload data for corresponding ones of the message headers, wherein separate ones of the message headers comprise a message stream identifier, a message type identifier, a timestamp, and a message length value; and
transmitting a data stream to the remote device, the data stream comprising messages arranged in the transmission order sequence, wherein separate ones of the messages are based on a different one of the message headers and a corresponding different one of the media data samples,
wherein accessing hint information comprises accessing a document that comprises a hint segment, a first media metadata track, a second media metadata track, and a hint metadata track,
wherein the hint segment comprises the message headers and the media data samples,
wherein the hint metadata track includes pointers to respective ones of the message headers,
wherein the first media metadata track includes, in lieu of samples, one or more pointers to corresponding one or more audio samples of the media data samples within the hint segment, and
wherein the second media metadata track includes, in lieu of samples, one or more pointers to corresponding one or more video samples of the media data samples within the hint segment.

2. The method of claim 1, wherein transmitting the data stream to the remote device comprises transmitting the data stream in accordance with a Real-Time Messaging Protocol (RTMP), wherein each message header is arranged according to a RTMP message header format.

3. The method of claim 1, further comprising:
operating a server to deliver multiple streams to remote devices based on information including the hint information.

4. A method performed by data processing apparatus, comprising:
accessing a document that comprises hint information, a first media metadata track, and a second media metadata track, the hint information comprising a hint segment and a hint metadata track, the hint information comprising message headers, arranged in a transmission order sequence, that correspond to respective media data samples, the message headers being interleaved with the media data samples on a track, the media data samples including one or more video samples and one or more audio samples, wherein separate ones of the media data samples are arranged as message payload data for corresponding ones of the message headers, wherein separate ones of the message headers comprise a message stream identifier, a message type identifier, a timestamp, and a message length value; and
using the hint information to render media content,
wherein the hint segment comprises the message headers and the media data samples,
wherein the hint metadata track includes pointers to respective ones of the message headers,
wherein the first media metadata track includes, in lieu of samples, one or more pointers to corresponding one or more audio samples of the media data samples within the hint segment, and
wherein the second media metadata track includes, in lieu of samples, one or more pointers to corresponding one or more video samples of the media data samples within the hint segment.

5. The method of claim 4, wherein each message header is arranged according to a Real-Time Messaging Protocol (RTMP) message header format.

6. A non-transitory computer storage medium encoded with a computer program, the program comprising instructions that when executed by data processing apparatus cause the data processing apparatus to perform operations comprising:
communicating with a remote device to stream media content to the remote device;
accessing hint information associated with the media content, the hint information comprising message headers, arranged in a transmission order sequence, that correspond to respective media data samples, the message headers being interleaved with the media data samples on a track, the media data samples including one or more video samples and one or more audio samples, wherein separate ones of the media data samples are arranged as message payload data for corresponding ones of the message headers, wherein separate ones of the message headers comprise a message stream identifier, a message type identifier, a timestamp, and a message length value; and transmitting a data stream to the remote device, the data stream comprising messages arranged in the transmission order sequence, wherein separate ones of the messages are based on a different one of the message headers and a corresponding different one of the media data samples, wherein accessing hint information comprises accessing a document that comprises a hint segment, a first media metadata track, a second media metadata track, and a hint metadata track, wherein the hint segment comprises the message headers and the media data samples, wherein the hint metadata track includes pointers to respective ones of the message headers, wherein the first media metadata track includes, in lieu of samples, one or more pointers to corresponding one or more audio samples of the media data samples within the hint segment, and wherein the second media metadata track includes, in lieu of samples, one or more pointers to corresponding one or more video samples of the media data samples within the hint segment.

7. The non-transitory computer storage medium of claim 6, wherein transmitting the data stream to the remote device comprises transmitting the data stream in accordance with a Real-Time Messaging Protocol (RTMP), wherein each message header is arranged according to a RTMP message header format.

8. The non-transitory computer storage medium of claim 6, the operations further comprising:
operating a server to deliver multiple streams to remote devices based on information including the hint information.

9. A system comprising:
a storage device configured to store information comprising a document that includes hint information associated with media content; and
an endpoint operable to communicate with the storage device, the endpoint configured to perform operations comprising:
accessing the hint information, the hint information comprising message headers, arranged in a transmission order sequence, that correspond to respective media data samples, the message headers being interleaved with the media data samples on a track, the media data samples including one or more video samples and one or more audio samples, wherein separate ones of the media data samples are arranged as message payload data for corresponding ones of the message headers, wherein separate ones of the message headers comprise a message stream identifier, a message type identifier, a timestamp, and a message length value; and
providing a data stream based on the hint information, the data stream comprising messages arranged in the transmission order sequence, wherein separate ones of the messages are based on a different one of the message headers and a corresponding different one of the media data samples,
wherein the document comprises a hint segment, a first media metadata track, a second media metadata track, and a hint metadata track,
wherein the hint segment comprises the message headers and the media data samples,
wherein the hint metadata track includes pointers to respective ones of the message headers,
wherein the first media metadata track includes, in lieu of samples, one or more pointers to corresponding one or more audio samples of the media data samples within the hint segment, and
wherein the second media metadata track includes, in lieu of samples, one or more pointers to corresponding one or more video samples of the media data samples within the hint segment.

10. The system of claim 9, wherein providing the data stream comprises transmitting the data stream to a remote device, wherein transmitting the data stream to the remote device comprises transmitting the data stream in accordance with a Real-Time Messaging Protocol (RTMP), wherein each message header is arranged according to a RTMP message header format.

* * * * *